United States Patent
Kim et al.

(10) Patent No.: US 7,599,343 B2
(45) Date of Patent: Oct. 6, 2009

(54) METHOD FOR TRANSMITTING AND RECEIVING BEACON INFORMATION IN WIRELESS LAN MESH NETWORK

(75) Inventors: Jae-Hoon Kim, Seoul (KR); Ji-Hoon Lee, Cheongju-si (KR); Young-Gon Choi, Suwon-si (KR); Jung-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 231 days.

(21) Appl. No.: 11/516,669

(22) Filed: Sep. 7, 2006

(65) Prior Publication Data
US 2007/0064671 A1    Mar. 22, 2007

Related U.S. Application Data

(60) Provisional application No. 60/714,271, filed on Sep. 7, 2005.

(30) Foreign Application Priority Data
Jul. 11, 2006    (KR)    ........................ 10-2006-0064929

(51) Int. Cl.
*H04J 3/06*    (2006.01)
(52) U.S. Cl. ....................... 370/338; 370/254
(58) Field of Classification Search ................. 370/338, 370/254
See application file for complete search history.

(56) References Cited

U.S. PATENT DOCUMENTS

| | | | |
|---|---|---|---|
| 2004/0208152 A1* | 10/2004 | Perkins et al. | 370/338 |
| 2006/0018298 A1 | 1/2006 | Dilipkumar Jogi | |
| 2006/0092909 A1 | 5/2006 | Ho | |
| 2006/0268746 A1* | 11/2006 | Wijting et al. | 370/254 |

OTHER PUBLICATIONS

"Optimizing the Beacon Exchange Rate for Proactive Autonomic Configuration in Ubiquitous MANETs", Iqbal, M.M; Gondal, I; Dooley, L; Wireless and Optical Communications Networks, 2005. WOCN 2005. Second IFIP Intenational Conference on Mar. 6-8, 2005 pp. 340-345.

* cited by examiner

*Primary Examiner*—Vincent P Harper
*Assistant Examiner*—Natasha Cosme
(74) *Attorney, Agent, or Firm*—Charles Y. Park

(57) ABSTRACT

Provided is a method for transmitting beacon timing information from a transmission node in a wireless Local Area Network (LAN) mesh network. In the method, each of a plurality of nodes transmits a beacon signal with its unique offset within a beacon signal transmission time period and the transmission node periodically transmits beacon timing information including a first unique offset within the beacon signal transmission time period. The transmission node sets a second offset different from the first offset and transmits probe beacon timing information including the first offset and the second offset.

14 Claims, 4 Drawing Sheets

| Octets : 1 | 1 | 3 | 1 | 3 | 1 | 3 | ... | 1 | 3 |
|---|---|---|---|---|---|---|---|---|---|
| ID | Length | Tentative Beacon Timing of self | Last byte of MAC Address of self | Original Beacon Timing of self | Last byte of MAC Address of terminal 1 | Beacon Timing terminal 1 | ... | Last byte of MAC Address of terminal n | Beacon Timing terminal n |

102 — Tentative Beacon Timing of self
104 — Last byte of MAC Address of self
106 — Original Beacon Timing of self

FIG.2

| Octets : 1 | 1 | 3 | 1 | 3 | 1 | 3 |
|---|---|---|---|---|---|---|
| ID | Length | Tentative Beacon Timing of self | Last byte of MAC Address of self | Beacon Timing self | Last byte of MAC Address of the sender | Confirm Beacon Timing of the sender |

FIG.3

METHOD FOR TRANSMITTING AND RECEIVING BEACON INFORMATION IN WIRELESS LAN MESH NETWORK

CROSS-REFERENCE TO RELATED APPLICATIONS

This application claims the benefit under 35 U.S.C. § 119 (e) for an application entitled "Method for Transmitting and Receiving Beacon Information in Wireless LAN Mesh Network" filed in the United States Patent and Trademark Office on Sep. 7, 2005 and assigned Ser. No. 60/714,271, and claims the benefit under 35 U.S.C. § 119(a) for an application entitled "Method for Transmitting and Receiving Beacon Information in Wireless LAN Mesh Network" filed in the Korean Intellectual Property Office on Jul. 11, 2006 and assigned Ser. No. 2006-64929, the entire disclosures of both of which are hereby incorporated by reference.

BACKGROUND OF THE INVENTION

1. Field of the Invention

The present invention generally relates to a mesh network. More particularly, the present invention relates to a method for transmitting information associated with a beacon signal in a wireless mesh network.

2. Description of the Related Art

In a mobile communication system, a Mesh Point (MP) has a limited range in which a signal can be wirelessly transmitted. To solve this problem, a multi hop technique is used for communication with another MP or an Access Point (AP) that is outside the wireless transmission range of the MP. An example of a communication system using the multi hop technique is a wireless mesh network. A wireless mesh network is a communication system in which each MP performs data communication and relays and routes a signal received from another MP in the same network to yet another MP.

To prevent signal collision between MPs in the wireless mesh network, synchronization is employed. To facilitate synchronization, a beacon signal is used. Each of the MPs transmits the beacon signal with a predetermined time offset. Thus, beacon signal detection is essential for smooth communication between the MPs. However, a beacon signal of an MP may collide with a beacon signal of another MP due to the occurrence of a special event. Thus, if beacon signals collide with each other or a collision between the beacon signals is not previously detected, a network may segregate and a specific MP may fail to join the network. Accordingly, there is a need for preventing collisions between beacon signals in a wireless mesh network.

SUMMARY OF THE INVENTION

Exemplary embodiments of the present invention address at least the above problems and/or disadvantages and provide at least the advantages described below. Accordingly, an aspect of the present invention is to provide a method for preventing collisions between beacon signals in a wireless mesh network by transmitting a beacon signal from each MP at a different time.

According to one aspect of an exemplary embodiment of the present invention, there is provided a method for transmitting beacon timing information from a transmission node in a wireless Local Area Network (LAN) mesh network. In the method, each of a plurality of nodes transmits a beacon signal with its unique offset within a beacon signal transmission time period and the transmission node periodically transmits beacon timing information comprising a first unique offset within the beacon signal transmission time period. The transmission node sets a second offset different from the first offset and transmits probe beacon timing information including the first offset and the second offset.

According to another aspect of an exemplary embodiment of the present invention, there is provided a method for receiving beacon timing information at a reception node in a wireless Local Area Network (LAN) mesh network. The method includes the steps of receiving the beacon timing information from a transmission node, detecting whether the received beacon timing information includes the Medium Access Control (MAC) address of the transmission node, detecting a first offset and a second offset that are the beacon timing information of the transmission node if the received beacon timing information includes the Medium Access Control (MAC) address of the transmission node, checking if the second offset is the same as offsets of other transmission nodes, and selecting the first offset to transmit a beacon timing information retransmission request if the second offset is the same as offsets of other transmission nodes.

According to yet another aspect of an exemplary embodiment of the present invention, there is provided a computer-readable recording medium storing a program for implementing a method for transmitting beacon timing information from a transmission node in a wireless Local Area Network (LAN) mesh network. In the method, each of a plurality of nodes transmits a beacon signal with its unique offset within a beacon signal transmission time period and the transmission node periodically transmits beacon timing information including a first offset as its unique offset within the beacon signal transmission time period. The transmission node sets a second offset that is different from the first offset and transmits probe beacon timing information including the first offset and the second offset.

According to still another aspect of an exemplary embodiment of the present invention, there is provided a computer-readable recording medium storing a program for implementing a method for receiving beacon timing information at a reception node in a wireless Local Area Network (LAN) mesh network. The method includes the steps of receiving the beacon timing information from a transmission node, detecting whether the received beacon timing information includes the Medium Access Control (MAC) address of the transmission node, detecting a first offset and a second offset that are the beacon timing information of the transmission node if the received beacon timing information includes the Medium Access Control (MAC) address of the transmission node, checking if the second offset is the same as offsets of other transmission nodes, and selecting the first offset to transmit a beacon timing information retransmission request if the second offset is the same as offsets of other transmission nodes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain embodiments of the present invention will become more apparent from the following detailed description taken in conjunction with the accompanying drawings, in which:

FIG. 2 illustrates the format of a probe beacon timing element according to an exemplary embodiment of the present invention;

FIG. 3 illustrates the format of a probe response beacon timing element according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention include a method for transmitting and receiving beacon information to detect and avoid collisions between beacon signals in a wireless mesh network. In particular, a Mesh Access Point (MAP) or a Mesh Point (MP) transmits a beacon signal at a different time than a beacon signal of another recognized MP or MAP. By transmitting beacon signals at a different times, collisions between the beacon signals is prevented. In an exemplary implementation, the MAP and the MP are fixed or mobile nodes. The MAP manages a client node and the MP performs signal forwarding without a client node.

Figure 1A:
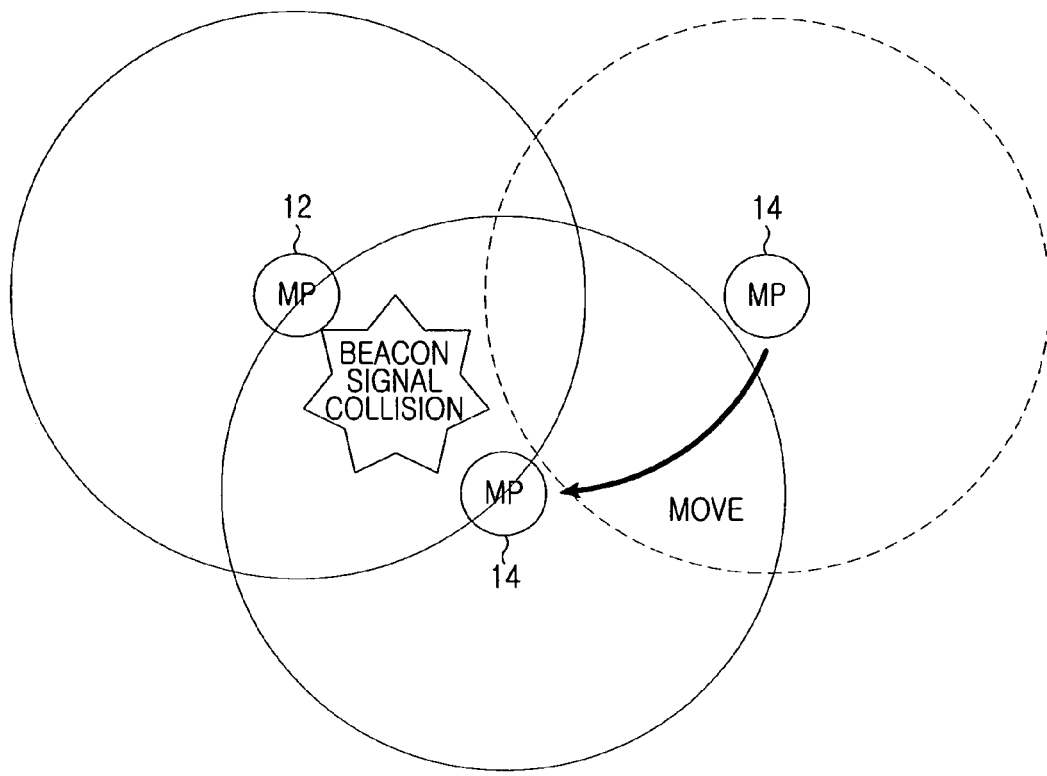
FIGS. 1A and 1B illustrate examples of collision between beacon signals.
Figure 1B:
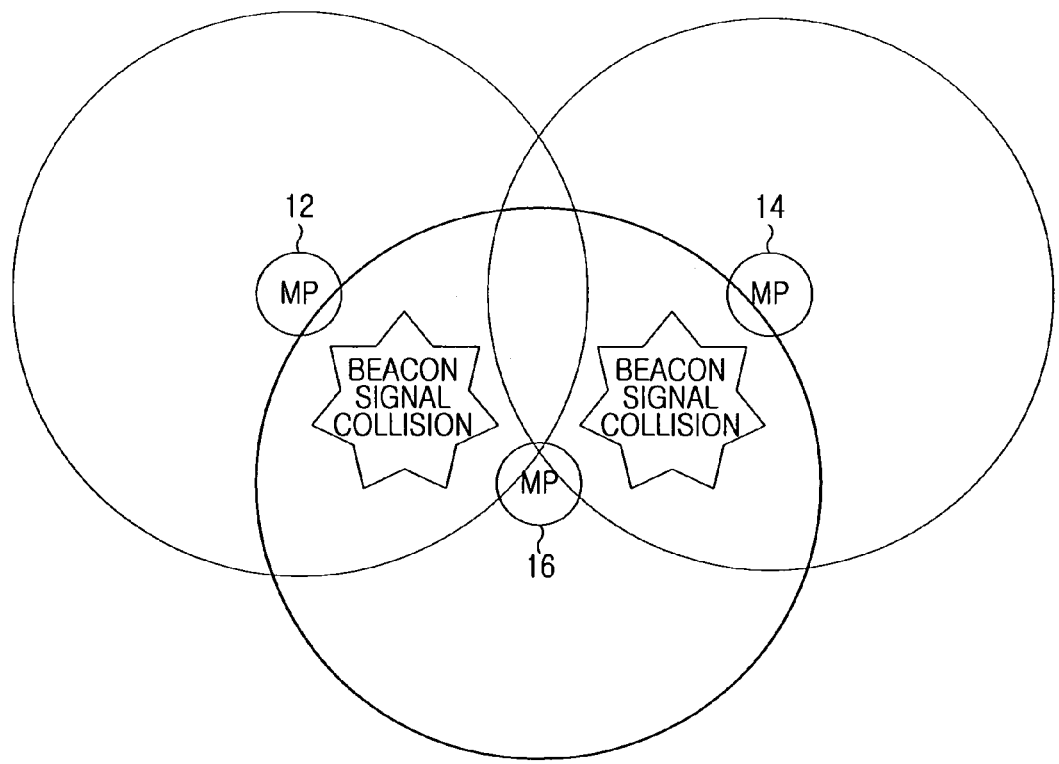

Prior to the explanation of exemplary embodiments of the present invention, the occurrence of collisions between beacon signals will be described in greater detail. A collision may occur as shown in FIGS. 1A and 1B. Generally, each of a plurality of MPs transmits a beacon signal within a certain beacon signal transmission time period in consideration of its unique offset.

As shown in FIG. 1A, when MPs 12 and 14 transmit beacon signals according to the same Target Beacon Transmission Time (TBTT) offset, the transmitted beacon signals do not collide with each other if MPs 12 and 14 maintain a specific distance from each other. However, if the MP 14 moves closer to MP 12, the transmitted beacon signals collide with each other as a result of MPs 12 and 14 using the same TBTT offset.

As shown in FIG. 1B, when a new MP 16 joins the network, collision between beacon signals occurs. For example, the MP 16 receives beacon signals from the MP 12 and the MP 14. Here, the MP 12 and the MP 14 transmits beacon signals according to the same TBTT offset. Thus, the MP 16 may not sense the presence of the MP 12 or the MP 14.

FIG. 2 illustrates the format of a probe beacon timing element according to an exemplary embodiment of the present invention.

Referring to FIG. 2, the probe beacon timing element is used for synchronization between MPs and the MPs either periodically or non-periodically transmit the probe beacon timing element. Thus, the probe beacon timing element includes the addresses of adjacent nodes (e.g., within 2 hops) and beacon timing information. Fields of the probe beacon timing element according to an exemplary embodiment of the present invention are also added to the probe beacon timing element.

The probe beacon timing element is formed by adding a tentative beacon timing-of-self field 102, a last byte of Medium Access Control (MAC) address-of-self field 104, and an original beacon timing-of-self field 106 to a general probe beacon timing element format.

Upon sensing a change in a network topology or the joining of a new MP, an MP selects a TBTT offset that is different from that of an adjacent NP. The selected TBTT offset is indicated by the tentative beacon timing-of-self field 102. The TBTT offset of the tentative beacon timing-of-self field 102 may be set according to a network environment, e.g., at the same time as a Delivery Traffic Indication Message (DTIM) time period. After the DTIM frame, buffered broadcast traffic and multicast traffic are transmitted.

The last byte of MAC address-of-self field 104 indicates the MAC address of a source MAP or MP.

The original beacon timing-of-self field 106 indicates the original TBTT offset that is used by the source MAP or MP prior to the change in the TBTT offset.

As mentioned above, an MP or MAP may transmit beacon timing element information to which the fields 102, 104, and 106 are added at an arbitrary time while periodically transmitting beacon timing element information in which the fields 102, 104, and 106 are omitted. Here, a TBTT offset selected, except for TBTT offsets of adjacent nodes (e.g., within 2 hops) previously recognized by an MP or MAP, is recorded in the tentative beacon timing-of-self field 102. Thus, the MP or MAP can, using the probe beacon timing element, determine whether or not beacon signals collide with each other when using the original TBTT offset.

FIG. 3 illustrates the format of a probe response beacon timing element according to an exemplary embodiment of the present invention.

Referring to FIG. 3, if an MP receiving probe beacon timing element information detects a beacon signal collision, it uses the probe response beacon timing element for transmitting a probe beacon transmission request, together with newly selected TBTT offset information, to a transmission MP. The newly selected TBTT offset information is beacon timing information that prevents beacon signals from colliding with each other, and is included in the probe response beacon timing element.

Figure 4:
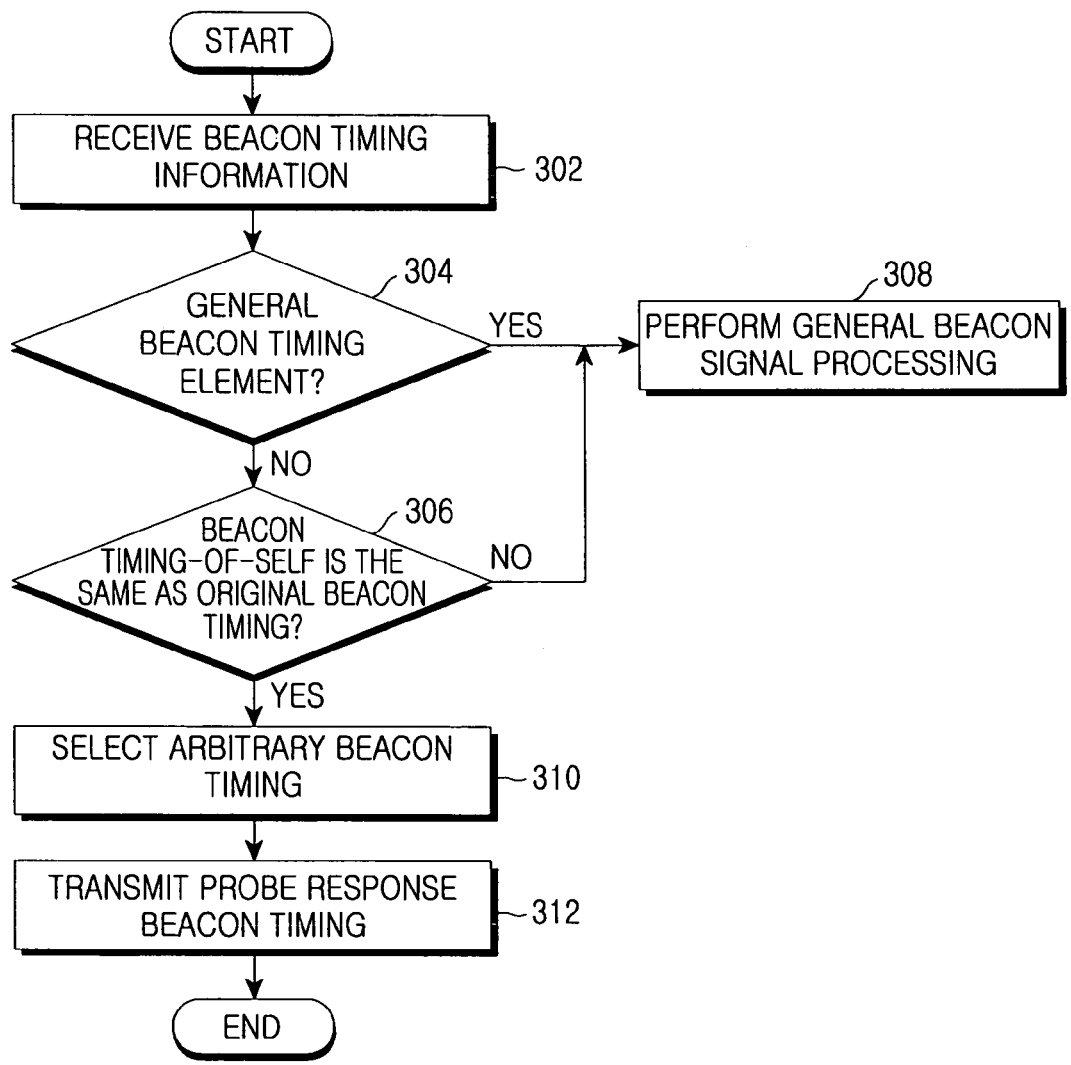
FIG. 4 is a flowchart illustrating a process in which a reception MP processes a beacon signal according to an exemplary embodiment of the present invention.

FIG. 4 is a flowchart illustrating a process in which a reception MP processes a beacon signal according to an exemplary embodiment of the present invention.

Referring to FIG. 4, the reception MP collects beacon timing information and MAC address information regarding adjacent MPs from a transmission MP by receiving a beacon timing element in step 302. In step 304, the reception MP checks if the first MAC address is the same as a source MAC address to determine whether the received beacon timing element is a general beacon timing element or a probe beacon timing element. The probe beacon timing element was discussed above with respect to FIG. 2. If the first MAC address is the same as the source MAC address, the first MAC address is the last byte of MAC address-of-self field 104 as disused above with respect to FIG. 2. Thus, the received beacon timing element is the probe beacon timing element including a TBTT offset. However, if the first MAC address is not the same as the source MAC address, the received beacon timing element is a general beacon timing element. Thus, the reception MP goes to step 308 to perform general beacon signal processing.

In step 306, the reception MP determines whether beacon timing-of-self information included in the received beacon timing element is the same as beacon timing information included in the original beacon timing information of adjacent nodes. If the beacon timing-of-self information is not the same as beacon timing included in the original beacon timing information, the reception MP goes to step 308.

If the original beacon timing information of the transmission MP is the same as the beacon timing information of the reception MP in step 306, the reception MP goes to step 310 to select tentative beacon timing-of-self information included in the received probe beacon timing element as a TBTT offset. In step 312, the reception MP transmits the probe response beacon timing element including the selected TBTT offset. Here, the reception MP may select a tentative beacon timing-of-self that is not the same as the original beacon timing of other nodes, instead of tentative beacon timing-of-self transmitted by the transmission MP.

As described above, according to exemplary embodiments of the present invention, by non-periodically transmitting probe beacon timing element information in addition to periodically transmitting conventional beacon timing element information in a wireless Local Area Network (LAN) mesh network, collisions between beacon signals can be detected or prevented.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A method of transmitting beacon timing information from a transmission node in a wireless Local Area Network (LAN) mesh network, the method comprising:
   transmitting, by each of a plurality of nodes, a beacon signal comprising a unique offset within a beacon signal transmission time period:
   periodically transmitting, by the transmission node, beacon timing information comprising a first unique offset within the beacon signal transmission time period;
   setting a second offset different from the first offset; and
   transmitting probe beacon timing information including the first offset and the second offset.

2. The method of claim 1, further comprising receiving, by the transmission node, offset information of nodes adjacent thereto.

3. The method of claim 2, wherein the probe beacon timing element information includes the second offset different from offsets of adjacent nodes of the transmission node, the Medium Access Control (MAC) address of the transmission node, and the first offset.

4. A method of receiving beacon timing information at a reception node in a wireless Local Area Network (LAN) mesh network, the method comprising:
   receiving the beacon timing information from a transmission node;
   detecting whether the received beacon timing information includes the Medium Access Control (MAC) address of the transmission node;
   if the received beacon timing information includes the Medium Access Control (MAC) address of the transmission node, detecting a first offset and a second offset that are the beacon timing information of the transmission node;
   checking if the second offset is the same as offsets of other transmission nodes; and
   if the second offset is the same as offsets of other transmission nodes, selecting the first offset to transmit a beacon timing information retransmission request.

5. The method of claim 4, wherein the first offset is set by the transmission node so that it can be distinguished from unique offsets of other nodes.

6. The method of claim 4, wherein the second offset is set prior to the first offset so that a beacon signal can be transmitted at an interval.

7. The method of claim 4, wherein the beacon timing information retransmission request includes the MAC address of the reception node.

8. A computer-readable recording medium storing a program to implement a method of transmitting beacon timing information from a transmission node in a wireless Local Area Network (LAN) mesh network, the method comprising:
   transmitting, by each of a plurality of nodes, a beacon signal comprising a unique offset within a beacon signal transmission time period:
   periodically transmitting, by the transmission node, beacon timing information comprising a first unique offset within the beacon signal transmission time period;
   setting a second offset different from the first offset; and
   transmitting probe beacon timing information including the first offset and the second offset.

9. The method of claim 8, further comprising receiving, by the transmission node, offset information of its adjacent nodes.

10. The method of claim 9, wherein the probe beacon timing element information includes the second offset different from offsets of adjacent nodes of the transmission node, the Medium Access Control (MAC) address of the transmission node, and the first offset.

11. A computer-readable recording medium storing a program to implement a method of receiving beacon timing information at a reception node in a wireless Local Area Network (LAN) mesh network, the method comprising:
   receiving the beacon timing information from a transmission node;
   detecting whether the received beacon timing information includes the Medium Access Control (MAC) address of the transmission node;
   if the received beacon timing information includes the Medium Access Control (MAC) address of the transmission node, detecting a first offset and a second offset that are the beacon timing information of the transmission node;

checking if the second offset is the same as offsets of other transmission nodes; and if the second offset is the same as offsets of other transmission nodes, selecting the first offset to transmit a beacon timing information retransmission request.

12. The method of claim 11, wherein the first offset is set by the transmission node so that it can be distinguished from unique offsets of other nodes.

13. The method of claim 11, wherein the second offset is set prior to the first offset so that a beacon signal can be transmitted at an interval.

14. The method of claim 11, wherein the beacon timing information retransmission request includes the MAC address of the reception node.

* * * * *